F. MÜLLER.
GRINDING MACHINE.
APPLICATION FILED MAR. 15, 1907. RENEWED MAY 13, 1911.
1,055,286.
Patented Mar. 4, 1913.
3 SHEETS—SHEET 1.
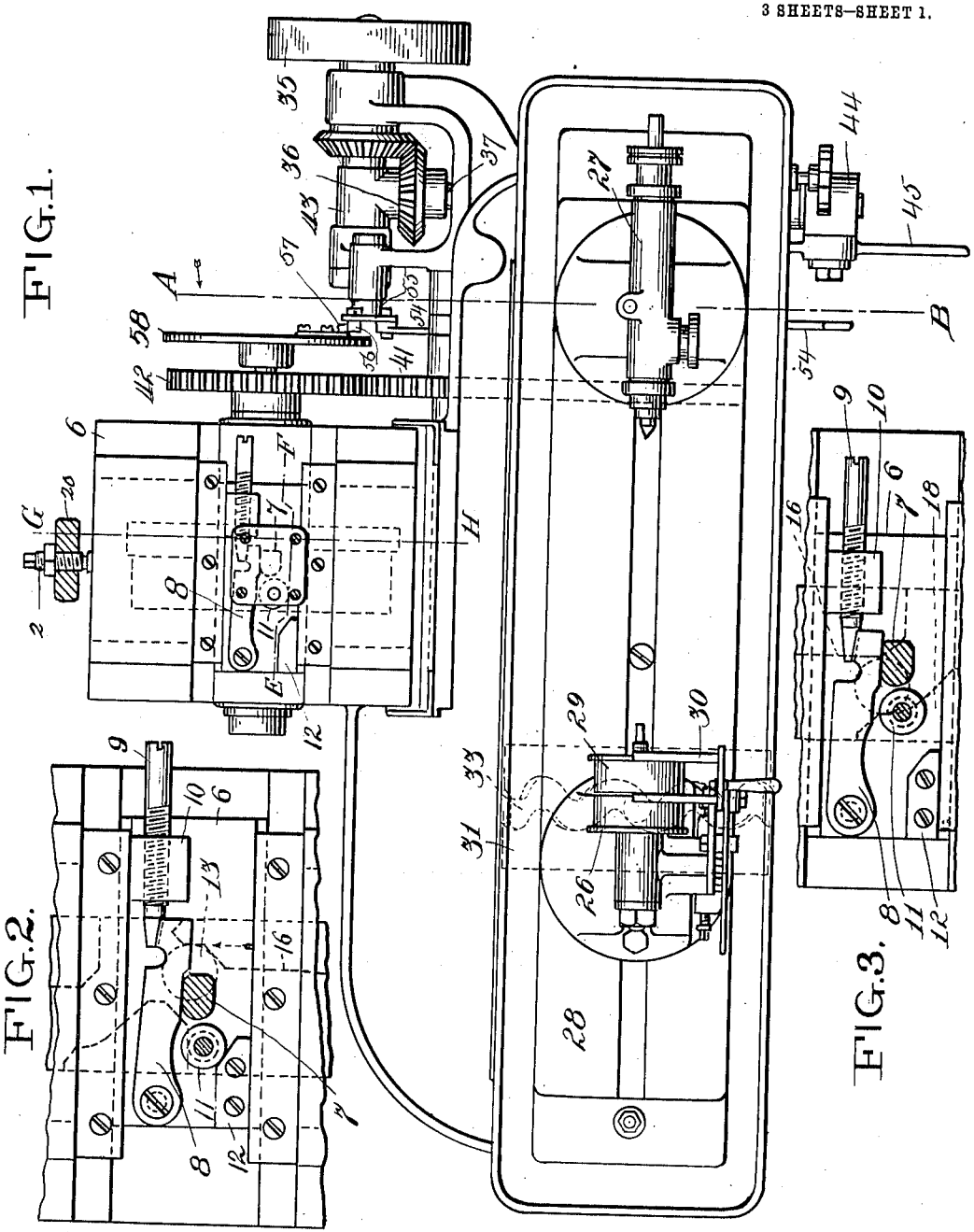
WITNESSES:
INVENTOR
Friederich Müller
BY J. H. Freeman
ATTORNEY

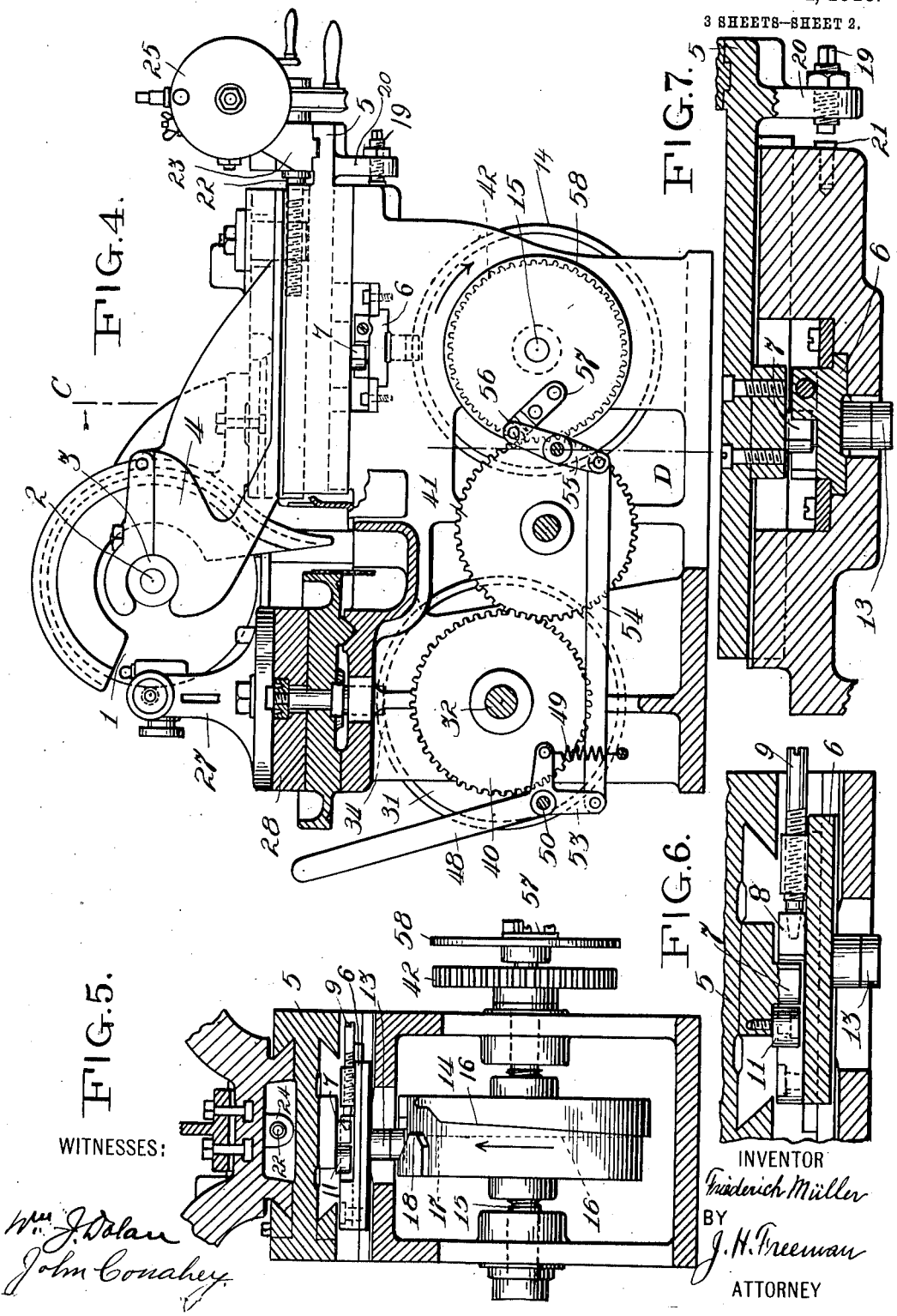

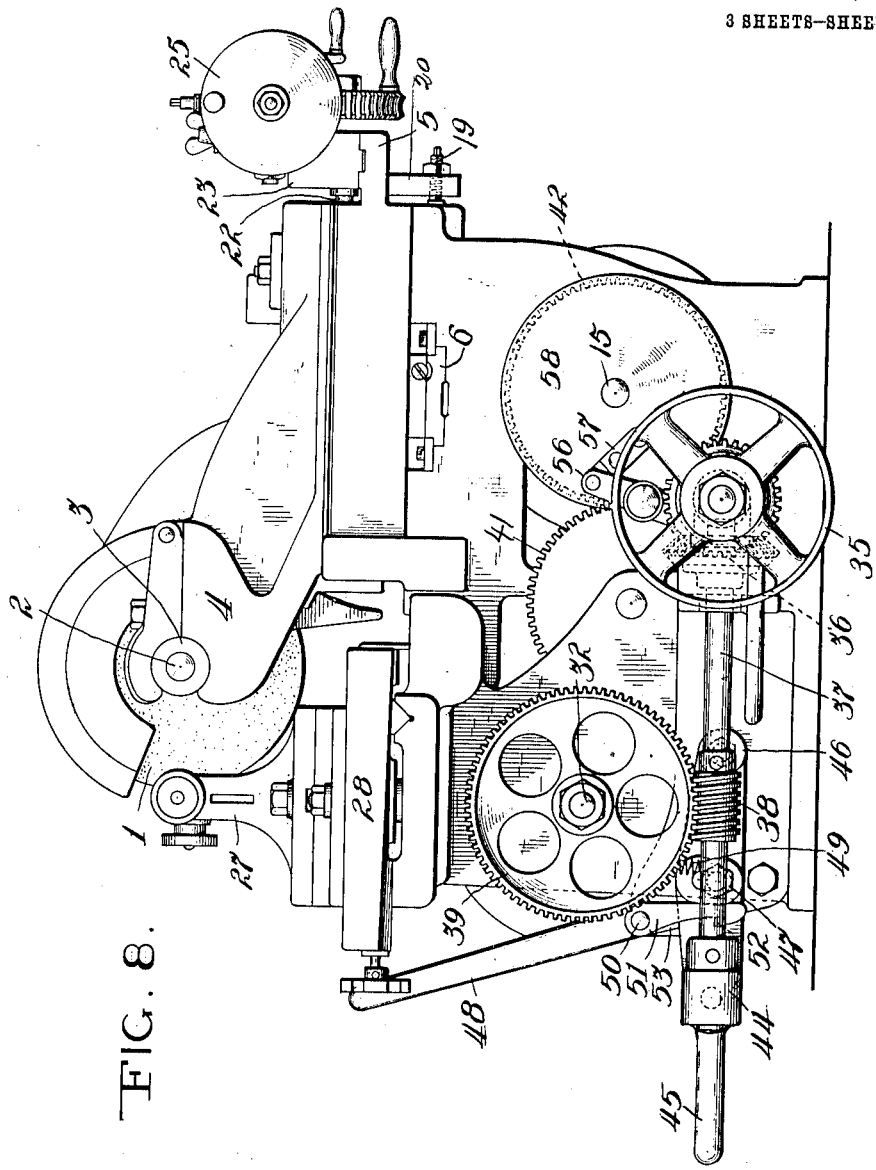

UNITED STATES PATENT OFFICE.

FRIEDERICH MÜLLER, OF ELIZABETH, NEW JERSEY.

GRINDING-MACHINE.

REISSUED

1,055,286.   Specification of Letters Patent.   Patented Mar. 4, 1913.

Application filed March 15, 1907, Serial No. 362,574. Renewed May 13, 1911. Serial No. 627,078.

*To all whom it may concern:*

Be it known that I, FRIEDERICH MÜLLER, a citizen of the United States, and a resident of Elizabeth, county of Union, and State of New Jersey, have invented certain new and useful Improvements in Grinding-Machines, of which the following is a specification.

The invention relates to grinding machines and in certain of its features more especially to machines in which work is automatically ground to a dimension within very exact limits, although in other of its features the invention may be applicable to grinding machines generally.

Objects of the invention are to provide a machine which will automatically grind the work to dimension within very exact limits without requiring constant care and attention from a skilled attendant; to provide a machine which will automatically separate the work and the wheel when the work has been ground to dimension; to provide a machine which, in addition to the grinding action proper, will automatically give an additional finishing or polishing action; to provide a machine which will give a variety of relative movements between the wheel and work and which provides for various combinations and variations of such movements for different purposes and kinds of work; to provide a machine which is capable of nice and accurate movement of parts; to provide for accurate and exact adjustment and variation of such movements; to provide for accurate grinding of the work and to provide for the elimination of inaccuracy due to spring or play that may occur in the parts of the machine; to provide a machine embodying these features, together with others, which shall require a minimum of attention from the attendant. These and other objects of invention will in part be obvious and will in part more fully appear hereinafter.

The invention consists in the novel parts, arrangements, improvements and combinations herein shown and described.

The accompanying drawings, referred to herein and forming a part hereof, illustrate one embodiment of the invention, the same serving in connection with the description herein to explain the principles of the invention.

Of the drawings: Figure 1 is a plan view, with parts removed, of a machine constructed in part in accordance with the principles of the invention; Figs. 2 and 3 are details showing parts of the mechanism for controlling the wheel supporting carriage in different positions; Fig. 4 is an elevation, partly in section, on the line A—B of Fig. 1; Fig. 5 is a sectional elevation on the line C—D of Fig. 4; Fig. 6 is a fragmentary sectional view substantially on the line E—F of Fig. 1; Fig. 7 is a fragmentary sectional view substantially on the line G—H of Fig. 1; and Fig. 8 is a right-hand end elevation, referring to Fig. 1 of the drawings.

In the machine illustrated as an embodiment of the invention in the accompanying drawings, means are shown for supporting the work and means for supporting a grinding wheel, and also means for causing a relative approaching movement between the wheel and the work. According to certain features of the invention this movement may be for the purpose of bringing the wheel and the work into operative relation, or it may be for the purpose of keeping them in operative relation as the work is ground away by the wheel, or it may be for a combination of these purposes. According to certain features of the invention, however, and as shown in the illustrated embodiment, the approaching movement comprises what may be termed two relative movements, one of the movements being a positioning movement to bring the work and the wheel into operative relation with each other after the work has been inserted in its support and the other movement to keep them in operative relation as the work is ground away by the wheel. In so far as concerns certain aspects of the invention it is also immaterial how the said relative approaching movement is effected, whether by combined movement of the wheel and the work, or by movement of the wheel toward the work, or of the work toward the wheel. According to certain features of the invention, however, and as shown in the illustrated embodiment, the wheel moves toward and from the work in performing the said movement. In the said illustrated embodiment means for effecting the functions indicated, together with other functions, are provided, the illustrated form of said means including a grinding wheel 1 mounted for rotation in any suitable or convenient manner, as upon a shaft 2 carried in bushings 3 upon a support 4. Any suitable means for rotating the grinding wheel may be provided. The support 4 is shown herein mounted upon a carriage 5. The said carriage in the present embodiment is movable upon the frame of the machine for effecting the relative approaching movement between the wheel and the work. In the form of means shown herein the said carriage is slidable upon suitable guides shown as being carried upon the machine frame.

The invention comprises, according to certain of its features, means for limiting the approaching relative movement of the work and the wheel and also comprises automatic means for causing a relative separating movement between the work and the wheel and further comprises, according to certain aspects of the invention, means for causing said separating means to operate at a definite period after the approaching movement has ceased or has been limited. Means for effecting these functions have accordingly been incorporated in the present embodiment. The forms of such means included herein comprise an auxiliary carriage 6 having movement in a direction transverse to that of the carriage 5. The said supports are so constructed and arranged that as the carriage 6 is moved transversely in one direction or the other that a suitable movement is imparted to the carriage 5 and to the grinding wheel 1 supported thereon. The said carriages are constructed and arranged so that one receives movement from the other. As illustrated, a lug 7 is connected rigidly to the carriage 5 and has sliding contact with a cam piece 8 upon the carriage 6. The face of the member 8 in contact with the lug 7 is so shaped that for a given motion of the carriage 6 a desired motion will be imparted to the carriage 5.

For the purpose of varying the relative position and movement of the two carriages the member 8 is shown as being pivotally mounted and as having suitable adjusting means co-acting therewith. The form of said adjusting means herein shown comprises a screw 9 threaded into a block 10 upon the carriage 6 the tapered end of the said screw bearing upon a suitably shaped face of the member 8. It will be seen that as the screw is turned backward and forward the position of the cam faces upon the member 8 will be varied relatively to the carriage 6 upon which the member 8 is carried. Carried also upon the carriage 5 is a second engaging device, shown herein as an anti-friction roll 11. A second cam piece 12 is shown fixed upon the carriage 6. The anti-friction roll 11 and the cam piece 12 are adapted to contact with each other at certain times in order to also control the movement of the carriage 5 with respect to the carriage 6 as will hereinafter be more fully set forth.

The carriage 6 is provided with a suitable member for engaging suitable actuating means, said actuating means serving to move and control the carriage 6 and thereby the carriage 5 and the grinding wheel 1. As herein shown said engaging member comprises an anti-friction roll 13, which is shown in engagement with a cam member 14. Said cam member 14, in the present embodiment, is mounted for rotation upon a shaft 15. Upon the said cam member 14 are shown certain cam surfaces which for convenience may be designated as 16, 17 and 18, suitably shaped to impart certain movements to the carriage 6, and the operation of which will be hereinafter more fully set forth. The cam member 14 is herein shown as being adjustable upon the shaft 15, thus serving to adjust and regulate the position and movement of the carriage 6. The illustrated form of such adjustment comprises a screw thread upon the shaft 15 upon which the member 14 is threaded and suitable holding devices of any convenient form for holding the cam 14 and shaft 15 in their adjusted position. The approaching movement for keeping the work and wheel in operative relation as the wheel grinds away the work or what may be termed the "feeding" movement may be continuous, if desired, or it may consist of a succession of intermittent movements. Such variations in the movement can be effected by suitable means as for example by suitable changes in the contours of the cams.

In addition to the means already described for controlling and limiting the movement and position of the wheel 1, there is contemplated by certain features of the invention the providing of an adjustable stop upon the carriage 5 for positively limiting the approaching movement. The said adjustable stop comprises a member 19 threaded in a lug 20 fixed relatively to the carriage 5, one face of the member 19 being adapted to contact with a suitable face 21 carried upon the frame of the machine. This additional limiting means serves to assist in positively limiting the approaching movement of the wheel in case the same should be rendered more or less varied by any spring or play in the connected parts between the wheel and the devices for controlling its movement. Suitable means may also be provided for giving an adjustment of the support 4 for the grinding wheel 1 with respect to its carriage 5 and according to certain features of the invention such means are contemplated. The form thereof is herein shown comprising a rotatable screw-threaded rod 22, rotating in a block 23 upon the carriage 5, and threaded into a lug 24 upon the support 4. Suitable means for giving a nicely controlled rotation to the screw 22 is provided, such means being indicated generally by the reference numeral 25.

According to certain features of the invention, a relative advancing movement between the wheel and the work is contemplated and means for effecting such movement are included in the present embodiment. The said relative advancing movement is a movement in the direction of the plane in which the wheel rotates and tangential to the wheel to cause the wheel to operate progressively on different parts of the work. In the present embodiment the said advancing movement is rotary, although so far as concerns many aspects of the invention it might be a rectilinear or other movement. In the illustrated form of means the said relative movement is obtained by the movement of the work, suitable means being provided for rotating the work before the grinding wheel. The illustrated form of said means comprises a head stock 26 and tail stock 27, provided with suitable centers and holding devices and being mounted upon a bed 28. Suitable driving devices are shown in connection with the head block. The said devices may be of any suitable or convenient form and as illustrated comprise a fast and loose pulley 29 and a belt shifter 30.

A relative traversing movement between the wheel and the work is contemplated by certain features of the invention. The said movement is a vibrating movement transversely to the direction of the plane in which the grinding wheel rotates. So far as regards many features of the invention it is immaterial whether the said movement is effected by moving the work, or moving the grinding wheel, or both. In the present embodiment it is obtained by movement of the work. As shown herein, the bed 28 is slidable longitudinally upon the frame of the machine (see particularly Figs. 4 and 8 of the drawings). Located adjacent to the said bed is shown a cam member 31 shown herein as of rotary form and as being mounted upon a suitable shaft 32. The said member 31 is further shown as having in its periphery a cam groove 33 which co-acts with a suitable part, such as the anti-friction roll 34, carried by the bed 28. It will be seen therefore that the bed 28 may have a to-and-fro longitudinal movement in the present embodiment as the work is rotated in contact with the rotating grinding wheel. The said traversing or vibrating movement may serve to feed different portions of the work into position to be operated upon by the grinding wheel where the surface of the work to be operated upon is of greater extent transversely than the width of the grinding wheel. Where the surface of the wheel is in operative relation with the entire extent of the surface of the work transversely, a movement of this kind is useful in causing a more uniform action of the grinding wheel and thus obviating the effects of any slight imperfections in the grinding surface of the wheel and conduces also to an even wearing of the wheel.

In the last mentioned condition and, preferably, in the first mentioned condition the extent or amplitude of the vibrating movement is such that the grinding wheel remains in contact with the work during the entire grinding operation, which is conducive to accuracy and uniformity of results. In the illustrated embodiment the extent of vibrating movement is predetermined by the shape of the cam groove 33 and is not dependent upon the length of the surface to be ground, which, as indicated by the distance between the head and tail stocks 26 and 27, shown in Fig. 1, may be much greater than the amplitude of the vibratory movement. The length of surface ground, when greater than the width of the wheel, is determined by that width in addition to the extent of the vibration. It will be understood that the extent of movement may be varied as also its rate by suitable changes, as for instance, in the form of the actuating cam, or in the gear connections by which the shaft is driven, or both. It will be understood that changes in the traversing movement and in the approaching movement may be combined in various ways to secure different effects, such changes being effected by suitable means, as for instance in the ways heretofore indicated. For example, an approaching movement could take place during an entire traversing movement and then cease during another entire traversing movement and these steps could be repeated a number of times, if desired, or the steps could be varied, or the movements otherwise combined as might be found suitable.

Suitable driving means and controlling means are provided and the form thereof shown in the drawings comprises a belt pulley 35 connected by a miter gearing 36 to a shaft 37. Upon the said shaft is a worm 38 in mesh with a worm wheel 39 upon the shaft 32. Gear 40 upon the shaft 32 meshes with a suitable intermediate 41 which in turn meshes with a gear 42 upon the shaft 15. In the present embodiment one end of the shaft 37 is journaled in a sleeve 43 adapted to rotate upon its support and the other end in a bearing 44 pivotally mounted upon a lever 45 which is in turn pivotally mounted at 46 upon the machine frame. A suitable pin-and-slot connection 47 is provided for limiting the movement of the lever 45. Fixed upon a shaft 50 suitably mounted on the frame of the machine is a lever 48 which is yieldingly impelled in one direction by suitable means such as a spring 49. Fixed also upon the shaft 50 is a hook 51 which is adapted to engage with a lug 52 upon the lever 45. An arm 53 fixed to the lever 48 is connected by a pivoted link 54 to a lever 55 having at its free end a friction roll 56 located in the path of the lug 57 upon the disk 58 carried upon the shaft 15.

The operation of the herein-described machine is substantially as follows: The pulley 35 may be connected to a suitable driving device. A piece of work is placed in position in the work support and rotation imparted thereto through the driving pulleys 29 upon the head block. At this time the hook 51 is out of engagement with the lug 52 and the lever 45 is at its lowermost position carrying the worm 38 out of engagement with its wheel. The operator lifts the lever 45 and the hook 51 yielding against the spring 49 snaps into position beneath the lug 52. The worm 38 is then in mesh with the wheel 39. The shafts 32 and 15 are thus caused to rotate. The rotation of the shaft 32 through the cam 33 imparts a transverse or vibrating movement to the bed 28 and to the work supported thereon.

The carriage 5 and auxiliary carriage 6 may be regarded as being substantially in the position shown in Fig. 2. The lug 13 by the rotation of the member 14 rides along the first steep portion of its cam, moving the carriage 6 quickly to the left, as seen in Fig. 2. The lug 7 also rides up the first steep incline upon the cam surface of the member 8 thus giving the carriage 5, the grinding wheel 1, and the connected parts a relatively quick idle movement toward the work. The anti-friction roll 13 is now in contact with the gentle inclined cam surface 16 on the member 14 and slowly but positively or unyieldingly moves the carriage 6 toward the left, referring again to Fig. 2. During substantially all this time the lug 7 is in contact with the next inclined face of the cam piece 8, (see Fig. 3) which has usually a very small degree of inclination and is slowly and positively moving or "feeding" the wheel toward the work to keep the wheel and the work in operative relation as the work is ground away by the wheel, the extent and speed of this movement being predetermined by the shape of the cam surfaces and the adjustment of the screw 9. Referring to Fig. 5 of the drawings it will be noted that the cam surface 16 extends into the cam surface 17 which is straight and therefore as the member 14 rotates allows the carriage 6 to remain stationary. There is therefore no advance movement of the carriage 5 and the grinding wheel 1 while the roll 13 is traveling along the surface 17. Substantially at the time the roll 13 reaches the surface 17 the pin 19 engages its stop 21 thus positively limiting the approaching movement of the wheel 1 toward the work. The wheel 1 continues to rotate however, as does also the work, and thus any spring or unevenness in the surface of the work is ground away and the finer and, what may be termed a polishing and dimensioning finish given to the work. The shaft 15 continuing its rotation, the roll 13 now comes in contact with the cam piece 18 and the carriage 6 is then given a relatively quick movement in the opposite direction. At substantially the same time the roll 11 upon the carriage 5 comes in contact with the cam piece 12 upon the auxiliary carriage 6 and the carriage 5 is moved backwardly carrying the grinding wheel with it from the work. It will thus be seen that the separation of the wheel and work occurs at a definite period after the approaching movement has ceased or has been limited. At about this time the lug 57 upon the disk 58 encounters the roll 56 on the lever 55. Lever 55 rocks backwardly and thus rocks the shaft 50 and causes the hook 51 to leave the lug 52, whereupon the lever 45 drops downwardly and the worm 38 passes out of mesh with its wheel 39. The operator removes the work, inserts new work, and the machine is ready to pass into operation again.

From all the foregoing it will be understood that a machine has been provided which realizes the objects of invention and advantages herein set forth, together with other objects and advantages.

The invention, in its broader aspects, is not limited to the particular constructions shown, nor to any particular constructions by which it has been or may be carried into effect, as many changes may be made in the mechanism without departing from the main principles of the invention and without sacrificing its chief advantages.

What I claim is:

1. A grinding machine including in combination a grinding wheel, means for supporting the work, automatic means for causing a positive and predetermined relative approaching movement between the wheel and the work, automatic means for causing a relative advancing movement between the wheel and the work, automatic means for causing a vibrating movement between the wheel and the work and automatic means for separating the wheel and the work.

2. A grinding machine including in combination a grinding wheel, means for supporting the work, automatic means for causing a relative approaching movement between the wheel and the work, automatic means for causing a vibrating movement between the wheel and the work, and automatic means for separating the wheel and the work at a definite period after the approaching movement has ceased.

3. A grinding machine including in combination a grinding wheel, means for supporting the work, automatic means for causing a relative approaching movement between the wheel and the work, means for limiting such approaching movement, automatic means for causing a vibrating movement between the wheel and the work, and automatic means for separating the wheel and the work, said separating means being constructed and arranged to operate at a definite period after the approaching movement has been limited.

4. A grinding machine including in combination a grinding wheel, means for supporting the work, automatic means for causing a positive and predetermined relative approaching movement between the wheel and the work, automatic means for causing a relative vibrating movement between the wheel and the work, and automatic means for separating the wheel and the work.

5. A grinding machine including in combination a grinding wheel, means for supporting the work, automatic means for causing a relative approaching movement between the wheel and the work, automatic means for causing a relative advancing movement between the wheel and the work, automatic means for causing a relative vibrating movement between the wheel and the work, and automatic means for separating the wheel and the work, at a definite period after approaching movement has ceased.

6. A grinding machine including in combination a grinding wheel, means for supporting the work, automatic means for causing a relative approaching movement between the wheel and the work, means for limiting the approaching movement, automatic means for causing a relative advancing movement between the wheel and the work, automatic means for causing a relative vibrating movement between the wheel and the work, and automatic means for separating the wheel and the work, said separating means being constructed and arranged to operate at a definite period after the approaching movement has been limited.

7. A grinding machine including in combination a grinding wheel, means for supporting and rotating the work, automatic means for causing a positive and predetermined relative approaching movement between the wheel and the work, automatic means for causing a vibrating movement between the wheel and the work, and automatic means for separating the wheel and the work.

8. A grinding machine including in combination a grinding wheel, means for supporting and rotating the work, automatic means for causing a relative approaching movement between the wheel and the work, automatic means for causing a vibrating movement between the wheel and the work, and automatic means for separating the wheel and the work, said separating means being constructed and arranged to operate at a definite period after said approaching movement has ceased.

9. A grinding machine including in combination a grinding wheel, means for supporting and rotating the work, automatic means for causing a relative approaching movement between the wheel and the work, means for limiting the approaching movement, automatic means for causing a vibrating movement between the wheel and the work, and automatic means for separating the wheel and the work.

10. A grinding machine including in combination a grinding wheel, means for supporting and rotating the work, automatic means for causing a relative approaching movement between the wheel and the work, means for limiting the approaching movement, automatic means for causing a vibrating movement between the wheel and the work, and automatic means for separating the wheel and the work, said separating means being constructed and arranged to operate at a definite period after the approaching movement has been limited.

11. A grinding machine including in combination a support for a grinding wheel, a work support, one of said supports being mounted upon a slidable carriage, a movable cam member constructed and arranged to control the movement of the said carriage, said cam member being pivotally mounted, and a screw-threaded member for adjustably positioning the said pivoted cam member.

12. A grinding machine including in combination a support for a grinding wheel, a work support, one of said supports being mounted upon a slidable carriage, a second carriage slidable transversely to the path of the first carriage, connections between the said carriages whereby the movement of the second carriage affects the movement of the first, and means for adjusting the connections between the said carriages so as to vary the movement of the first carriage for a given movement of the second.

13. A grinding machine including in combination a support for a grinding wheel, a work support, one of said supports being mounted upon a slidable carriage, a second carriage slidable transversely to the path of the first carriage, a cam member upon one of the said carriages constructed and arranged to engage the other carriage, and screw-threaded means for adjusting the position of said cam member so as to vary the movement of one carriage relatively to the other.

14. A grinding machine including in combination a support for a grinding wheel, a work support, one of said supports being mounted upon a slidable carriage, a second carriage slidable transversely to the path of the first carriage, cam members between the two carriages for controlling the movement in both directions of the first carriage by the movement of the second carriage, and a rotary cam member for giving the second a definite length of stroke.

15. A grinding machine including in combination a grinding wheel, means for supporting the work, means for causing a relative approaching movement between the wheel and the work, means for separating the wheel and the work, driving means for said approaching means and separating means, and automatic means for throwing off the said driving means upon the completion of said approaching and separating movements.

16. A grinding machine including in combination a grinding wheel support, a work support, automatic means for causing said supports to approach each other with a relatively rapid idle movement and then with a relatively slow feeding movement, and automatic means for separating said supports.

17. A grinding machine including in combination a grinding wheel support, a work support, automatic means for causing said supports to approach each other with a relatively rapid idle movement and then with a relatively slow feeding movement, means for limiting said approaching movement, means for causing a vibrating movement between the wheel and the work and automatic means for separating said supports a definite period after said approaching movement has been limited.

18. A grinding machine including in combination a grinding wheel support, a work support, automatic means for causing said supports to approach each other with a relatively rapid idle movement and then with a relatively slow feeding movement, means for varying the amount of said relatively slow movement and means for adjustably limiting said approaching movement.

19. A grinding machine including in combination a grinding wheel support, a work support, automatic means for causing said supports to approach each other with a relatively rapid movement and then with a relatively slow movement, means for varying the amount of said relatively slow movement, means for adjustably limiting said approaching movement, and means for separating said supports a definite period after said approaching movement has been limited.

20. A grinding machine including in combination a grinding wheel, means for rotating the grinding wheel, a slidable carriage upon which the grinding wheel is mounted, means for adjusting the position of the grinding wheel relatively to its carriage, a second carriage slidable transversely to the path of the said first carriage, connections between the said carriages whereby the movement of the second carriage causes first a rapid and then a slow movement of the first carriage, means for driving said second carriage, means for supporting the work, means for rotating the work, and means for giving the work a vibrating movement relatively to the wheel.

21. A grinding machine including in combination a grinding wheel, means for rotating the grinding wheel, a slidable carriage for supporting the grinding wheel, means for adjusting the position of the grinding wheel with respect to its carriage, a second carriage slidable in a path transversely to that of the first carriage, connections between the said carriages whereby the second carriage moves the first, adjustments for the said connections for varying the movement of the first for a given movement of the second, adjustable means for positively limiting the movement of the first carriage, a rotary cam member for driving the second carriage, means for supporting the work. means for rotating the work, and means for giving the work a vibrating movement relatively to the grinding wheel.

22. A grinding machine including in combination, a grinding wheel, a work support, automatic means for causing a positive and predetermined relative approaching movement between the wheel and the work, automatic means for causing a relative advancing movement between the wheel and the work, automatic means for causing a vibrating movement between the wheel and the work, and automatic means for causing a cessation of the grinding action on the work.

23. A grinding machine including in combination, a grinding wheel support, a work support, means for effecting a predetermined relative approaching movement between said supports, and means for effecting a predetermined relative feeding movement between said supports.

24. A grinding machine including in combination, a grinding wheel support, a work support, means for effecting a predetermined relative feeding movement between said supports, and means for separating said supports at a predetermined priod after the feeding movement has ceased.

25. A grinding machine including in combination, a grinding wheel support, a work support, means for effecting a predetermined relative approaching movement between said supports, means for effecting a predetermined relative feeding movement between said supports, and means for separating said supports at a predetermined period after the feeding movement has ceased.

26. A grinding machine including in combination, a grinding wheel, means for supporting and rotating the work, means for effecting a positive and predetermined relative approaching movement between the wheel and the work, and means for effecting a relative vibrating movement between the wheel and the work, said vibrating movement being of such small amplitude that the grinding wheel remains in contact with the work during the grinding operation.

27. A grinding machine including in combination, a grinding wheel, means for supporting and rotating the work, means for effecting a positive and predetermined relative approaching movement between the wheel and the work, and means for effecting a relative vibrating movement between the wheel and the work, said vibrating movement being of an amplitude predetermined independently of the dimensions of the work to be ground.

28. A grinding machine including in combination, a grinding wheel, means for supporting and rotating the work, automatic means for effecting a relative approaching movement between the wheel and the work, means for positively limiting the approaching movement, and automatic means for effecting a vibrating movement between the wheel and the work, said vibrating movement being of an amplitude predetermined independently of the dimensions of the work to be ground.

29. A grinding machine including in combination, a grinding wheel, means for supporting and rotating the work, automatic means for effecting a relative approaching movement between the wheel and the work, means for effecting a relative vibrating movement between the wheel and the work, said vibrating movement being of an amplitude predetermined independently of the dimensions of the work, and automatic means for separating the wheel and the work at a definite period after the approaching movement has ceased.

In testimony whereof, I have signed my name to this specification, in the presence of two subscribing witnesses.

FRIEDERICH MÜLLER.

Witnesses:
 EDWIN SEGER,
 WM. J. DOLAN.